Aug. 3, 1948.     A. BASESCU     2,446,404
MOLD FORM
Filed Sept. 23, 1943

INVENTOR.
Arthur Basescu
BY
Pineles & Greene
ATTORNEYS

Patented Aug. 3, 1948

2,446,404

UNITED STATES PATENT OFFICE 2,446,404

MOLD FORM

Arthur Basescu, Brooklyn, N. Y.

Application September 23, 1943, Serial No. 503,493

7 Claims. (Cl. 18—45)

My invention relates to a novel form for use in fabrication of rubber or plastic bodies and more particularly my invention relates to a novel form and method of making the same which form can be employed for the manufacture of self-sealing gas tanks, the form after use in such process being crumbled and discharged through a small opening in the rubber tank or tank cover fabricated thereover.

In the manufacture of self-sealing gasoline tanks and similar other bodies, it has been found difficult to provide a form that is sufficiently rigid and has the proper surface to provide a base for the fabrication of rubber thereon, while at the same time being of a reasonably light weight and having such constitution that it can be discharged efficiently by mechanical breakdown and emission through the small inlet opening provided in the fabricated self-sealing gas tank.

The self-sealing or leak-proof tanks are now standard equipment for airplanes and particularly war planes because of the safety factor involved. These tanks must be provided in a multiplicity of different shapes since they are fitted in in different parts of the airplane. For example, tanks are provided in various parts of the wing structures and are also adapted to be disposed in various parts of the fuselage and recesses therein.

When the soft rubber covering is penetrated by gun fire or other projectile, the soft rubber closes in about the holes thus formed and quickly seals the tank or prevents any substantial flow of fuel therefrom. Thus resulting explosions and fires are materially reduced and prevented.

The only practical method of forming these self-sealing gas tanks which has been employed is the use of a large plaster mold of the required size and shape corresponding to the tank to be formed.

However, such plaster molds have not fully met the necessary prerequisites because of the difficulty in breaking down the plaster mold after use to sufficiently small pieces so that it can be easily and efficiently discharged through the relatively small opening which is formed in the gas tank after fabrication. The plaster forms have also been found to be exceedingly heavy and also difficult to transport and handle.

These plaster of Paris molds had other additional disadvantages, such as the time involved in making the mold form. The plaster of Paris form had to be built up by means of a series of layers of plaster of Paris applied in the form of a heavy cream to the inside of a forming mold. Considerable time is involved both because of the thinness of the individual layers being built and the time required for drying of the liquid plaster of Paris. Time, of course, is essential in the manufacturing operation and the considerable time element involved in building up of the necessary thickness of the plaster of Paris wall in the mold form was a serious impediment.

Further, there is a problem involved in the curing of the rubber mold formed on the plaster of Paris mold form, since the portion of the rubber adjacent the plaster of Paris does not heat up as fast as the outer portions, and hence difficulties are involved in the time factor of the curing operation.

Finally, there is a serious disadvantage in the number of rejects in the rubber tanks caused by the pounding operation involved in breaking down by means of a wooden mallet, the plaster of Paris formed within the tank. That is, after a tank is formed on the forming mold, namely the plaster of Paris forming mold of the prior art, it is necessary to remove the plaster of Paris mold by breaking it down into smaller pieces with a wooden mallet and discharging those small pieces through the opening provided in the gas tank. Blows of considerable force are required for effecting the breakdown of the solid plaster of Paris and injury by tearing or penetration of the rubber tank often resulted.

It is the object of the present invention to provide a novel mold form for the manufacture of self-sealing gas tanks and similar structures.

It is a further object of the present invention to provide a novel mold form that after usage can be broken down into very small particle size which can be easily discharged through a relatively small opening provided in the cover fabricated thereover.

It is a further object of the present invention to provide a novel method for making a large rigid form.

It is a further object of the present invention to provide a hard plaster form of substantial size but of relatively light weight.

I accomplish these objects by forming in a mold a plaster form comprising a first outer coating comprising dextrine, plaster of Paris and water which is patted on until a coating is formed over the mold employed in making the form of the present invention, after which a mix comprising balsa or wood sawdust, preferably shredded balsa, which is first thoroughly wetted and then mixed with plaster of Paris, is patted on to form an inner layer of sufficient strength to provide the necessary structural strength for the mold structure.

I may use any shredded wood that is light and fluffy in that form, but I prefer to use balsa wood because its properties generally for the purposes set forth herein are excellent. For that reason the wood component referred to in the specific illustration of my invention is balsa wood, but it is to be understood that other woods may be employed as set forth above.

Means are provided for preventing air occlusion within the mold which has been a serious hazard in the past. The mold structure thus formed has a hard, smooth, outer surface and a bulky strong inner surface, the entire mold being relatively light in weight and of such consistency that it can be easily crumbled to small particle form and discharged through an opening of for example one and one-half to four inches in diameter.

Further objects of the present invention will be apparent from a consideration of the drawings and the specific description thereof which here follows.

Figure 1:
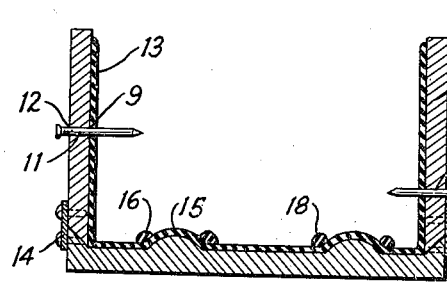
Figure 1 is a diagrammatic cross section showing the forming mold for making the mold form of the present invention and the first, outer layer applied thereto.

Referring now more specifically to the drawings, in Figure 1 I show a forming mold 8 in which the mold form is made. In openings 9 and 10 are disposed hole forming elements such as 11 which, as will be noted are in close engagement with the hole 9 as shown at 12. Reinforcement and connecting members 14 are employed for attaching the sides of the mold 8 to the bottom.

I first prepare a coating material which comprises:

| | Parts |
|---|---|
| Dextrine | 7 |
| Gypsum | 50 | to which is added sufficient water to form a mix having a heavy cream viscosity. This mix 13 is dabbed on to the mold 8 on both the sides and the bottom in such a manner as to avoid the inclusion of air bubbles and to form a thin coating 13 over the entire interior of the mold 8. It will be understood that the drawings here are diagrammatic and that the thickness of this coat 13 is exaggerated for clarity.

The coat 13 as will be explained more particularly hereafter provides a hard smooth and impermeable outer surface for the mold form to be produced. When the form is provided with irregularly shaped portions such as the humps 15 on the bottom, shown in Figure 1, I then act to reinforce these irregular portions by reinforcing material 16 and 18 which is applied along the weakest area portions. This reinforcing material and the interior bulk and strength providing portion of the mold form is formed from a mix which comprises:

| | Parts |
|---|---|
| Shredded balsa wood | 20 |
| Gypsum | 50 |

The balsa wood is kneaded into water until it has absorbed considerable water and becomes quite heavy and fluffy. A portion of the water is then expressed from the mix, after which the gypsum is added. This balsa-gypsum mix 19 (see Figure 2) is then applied on to the coat 13 as for example by patting gobs of this doughy mix against the internal wall and the coat 13. This doughy mix is extended at the upper portions to provide the internal extending lips 20 and 21 which provide increased adhesion surface area and stronger joint between the mold form shown in Figure 2 and the top thereto which is subsequently placed over the lips 20 and 21.

Figure 2:
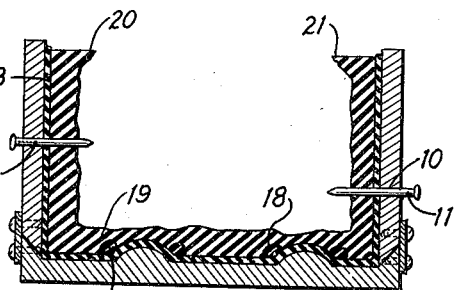
Figure 2 is a diagrammatic cross section showing the second stage in the process in which the relatively thick bulk balsa wood-plaster of Paris layer is formed on to the thin outer coating of dextrine and plaster of Paris.
Figure 5:
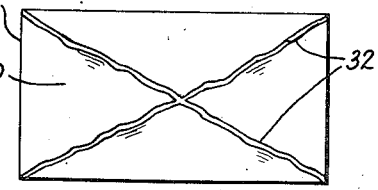
Figure 5 is a plan view of the inside of the lid showing the diagonal corner to corner reinforcement for strength.

A top portion 31 such as shown in Figure 5 similarly formed and comprising an upper coat 26 and a balsa wood-gypsum portion 30 is then independently formed and diagonal ridges 32 of the balsa-gypsum composition which extend from corner to corner are built up over the balso-gypsum portion 30 to provide cross members for increased structural strength. This top 31 is then applied to the sides and bottom portion previously formed as shown in Figures 1 and 2 and a good joint having a good surface area for adhesion because of the lips 20 and 21 is provided.

The hole forming elements such as spikes 11 are then withdrawn and the mold form of my invention removed from the outer forming mold 8 and placed in an oven 25 where it is dried for eleven hours at a temperature of about 220 to 250° F.; the drying time of course varying depending on the size of the mold, the thickness of the walls, the heating and baking capacity of the drying oven.

When a large gasoline tank mold is to be formed and the dextrine-gypsum coating has a thickness of about one-sixteenth of an inch and the balsa-gypsum layer has a thickness of about ¾ of an inch, then approximately sixty pounds of water must be dried out of each mold form.

The openings 9 and 10 allow air and gases within the drying mold form to escape and thus prevent deformation of the mold form during drying or the setting up of undesirable strains and stresses by reason of this internal air pressure that is developed during drying and setting.

Joints 27 and 28 between the top portion and the side portions are particularly strong by reason of the adhesion area and the increased bulk provided by the lips 20 and 21.

I have found that it is particularly desirable that one of the openings, such as 10, be disposed below the other opening 9 for the venting of internal air and gases.

The mold form thus produced has a number of new and desirable properties. Before a mold form of this type is actually used for forming a rubber tank for example thereover, it must be coated with liquid. In the previous mold forms this liquid penetrated into the gypsum and thus a considerably longer period of time was necessary for forming this operating coating and more liquid was necessary. The dextrine-gypsum outer coating 13 formed according to my invention is impermeable and hence the amount of liquid necessary and the time of application is materially reduced. The outer dextrine-gypsum coating has sufficient hardness and smoothness so as to provide a good mold surface. The interior balsa-gypsum layer has very satisfactory mold strength and at the same time after the operation is complete both the inner layer 19 and the outer coating 13 can be broken down and crumbled to a soft and fine particle size by manipulation so that all of the mold form can be discharged through a very small opening. Previously it was necessary to wash out mold forms of this kind and considerable difficulty was encountered by this method. The balsa wood-gypsum combination appears to make a compound that although it has original structural strength for being molded over, nevertheless when broken down crumbles to a resilient fine mass that can be readily discharged either in the dry state or, if desired, in the wet state by the addition of fluids.

Curing of the rubber molded over the mold form of my invention can be accomplished either with dry heat or with steam. The mold form itself is relatively light and can therefore be readily handled and transported. The reinforcing top ridges 32 and irregular area ridges 16 and 18 of self-material provide surprising structural strength and eliminate the necessity for wooden struts or other reinforcing elements that have been previously employed. Such wooden struts or other structural elements are obviously difficult to remove from the interior of the mold through a small tank opening after the molding thereover.

I wish to emphasize the particular desirability of the compositions I employ. While the outer coat 13 provides the hardness and smoothness and impermeability so desirable for the exterior surface of the mold, it nevertheless rapidly physically disintegrates to a fine powder or particle size upon being physically broken down, after usage.

In Figures 1 and 2 I show the irregular area ridges 16 and 18 which are reinforcing struts of self-material applied to those portions which would tend to be the weakest.

Figure 3:
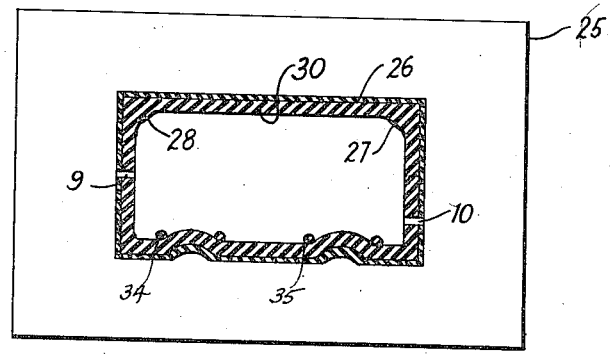
Figure 3 is a diagrammatic cross section showing the plaster mold form of the present invention with the top formed in place and positioned in a curing or baking oven.
Figure 4:
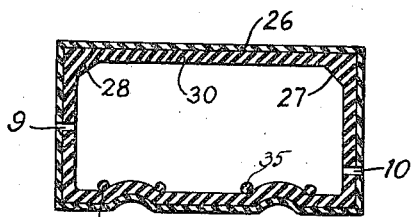
Figure 4 is a diagrammatic cross section showing the final product, namely the mold form produced according to my invention.

In Figure 3, 16 and 18 are not shown because it is assumed that this self-material, which may for example comprise plaster of Paris and shredded wood, would not be seen after the layer of light material 19 over it had set.

In Figures 3 and 5 I show how ridges 34 and 35 may be used either in lieu of the ridges 16 and 18 or in addition thereto to provide strength in the weak areas. These ridges 34 and 35 are also of self-material, that is, for example, shredded balsa wood and plaster of Paris composition and are applied over the weak areas.

The mold form of my present invention is particularly distinguished by the fact that although the form has quite a sufficient supporting structural strength with a necessary margin for safety for performing on it the necessary molding operations for forming a rubber or synthetic rubber gas tank, it can be easily broken up or disintegrated or discharged by a force equal to an impact of a firm blow of the palm of the worker's hand. This is in marked contrast to the rather forceful blow of a wooden mallet necessary to break down the plaster of Paris forms previously employed. Once the form has been cracked by the blow from the palm of the hand, the mold form can be rapidly crumbled or disintegrated by comparatively light hand manipulation through the rubber tank. The mold form crumbles easily to a small particle form, like rotten wood and this small particle form is very easily discharged through the opening which may, for example, be one and one-half to four inches in diameter, provided in the gas tank.

It will be obvious that because such relatively light blows are required for the breaking down of the mold form that there is little likelihood of any danger to the tank which is the product formed on this mold form.

There is a considerable saving in time by the method outlined herein over that employed in the prior art. As stated hereinabove, previously plaster of Paris was applied in the form of a heavy cream and a series of coatings were applied in the form of this cream to build up the thickness of the plaster of Paris wall desired. The doughy mix of balsa wood and plaster of Paris employed herein, which is patted on to the wall, forms a layer considerably faster than by a series of liquid coatings since each individual coating of liquid may be only a small fraction of an inch in thickness while the layer of doughy mix applied may be an inch or more of thickness. Conservatively estimated at least 33½% less time is required for the manufacture of a forming mold by the process of the present invention than by that of the prior art.

The particular method of forming the thick strength giving and bulky layer comprising balsa wood and gypsum or plaster of Paris which I have recited above gives important desirable results because I have found that when the wood is wet first before adding the plaster of Paris, that I avoid the cracks that result when the wood is mixed or added to the plaster of Paris while the wood is in the dry state. This may be because of the fact that when the wood is first wet it expands and hence when drying after being admixed with the gypsum it has sufficient yieldability or space for contraction so that no cracking of the plaster of Paris results. When the wood is added in the dry state, then when the plaster of Paris tends to shrink in setting, the wood often cracks the plaster of Paris. This is due to the fact that when the wood is added in the dry state it absorbs water from the wet plaster of Paris around it and swells, thus cracking the plaster of Paris as it sets.

I have found that when the wood, such as the balsa wood, is wetted before mixing with the plaster of Paris, that on drying air pockets and channels are formed internally in the inner layer 19. These air pockets and channels probably result because of the contraction of the wetted balsa when it is dried out.

The channels and air pockets thus formed within this layer are advantageous because they contribute to the lightness of the final form and because they increase the insulating properties of the mold form and create a mold form of low specific heat. Hence during the curing of the rubber when heat is applied externally, the surface of this mold form rapidly heats up and little heat is lost by internal transfer through the mold form so that a more rapid uniform cure of the rubber which is laid over the mold form is effected.

The mold form which is the product of my invention is often referred to in this art as a "cast" and it will be understood that I use the term mold form with reference to such "cast."

The terms gypsum and plaster of Paris are used interchangeably in this art and in the present application and are understood to refer to the hydrated calcium sulfate normally employed and termed plaster of Paris in this art.

A further advantage of the present invention lies in the fact that whereas previously during the manufacturing operation of forming rubber gas tanks over the mold forms made of plaster of Paris, it was found that the plaster of Paris form would crack or split during that operation, whereupon loss of the entire time involved and substantial loss of material would result, whereas there is little, if any, incidence of splitting or cracking in the mold forms of the present invention, so that considerable loss in time and materials is averted. This is probably due to the fact that the shredded fluffy wood, particularly balsa wood, that constitutes such a considerable bulk of the mold form, has sufficient resilience to compensate for the strains, stresses and rigidity which normally would cause the cracking of the plaster of Paris. The resilience thus supplied by the wood is a safety factor that substantially reduces the incidence of the splitting or breakage.

It is to be understood that various modifications of my invention will suggest themselves to those skilled in the art. Various external coatings can be used in lieu of the gypsum and dextrine outer coat which I have found particularly desirable for the reasons set forth hereinabove. As I have stated herein various woods may be employed in shredded form in place of the balsa, but an outstanding feature of this invention lies in the fact that the combination of wood, and particularly balsa wood with the plaster of Paris in the manner described hereinabove produces a strong mold form or cast that may be used for molding operations such as molding gas tanks and has sufficient strength therefor, while at the same time it may be quickly and easily broken down to such small size for ready discharge through a small opening.

This is in marked contradistinction to the plain plaster of Paris or other mold forms previously employed.

I desire that in construing the breadth of the appended claims that they shall not be limited to the specific details shown, but to the invention as generally described herein.

It is to be understood that the mold form of the present invention can be utilized not only for the manufacture of gas tanks and the like, but this mold form may be used for the manufacture of any rubber, plastic or moldable material which is to be formed by dipping, coating, brushing or sheet application into an object of such shape that a relatively small opening is provided for removal of the mold form. This mold form can, for example, be used for the manufacture of hot water bottles and similar other containers of that physical type.

Although I have found that shredded wood, particularly shredded balsa wood, is preferable for use with the plaster of Paris in the making of a mold form that can be broken up and crumbled to a small discrete particle form, I may alternatively employ shredded paper, that is, paper that has been torn up or shredded to irregular, fluffy form, such shredded paper being first wetted as described above in connection with the wetting of the shredded balsa wood and while still wet combined with plaster of Paris. The mold form made of shredded fluffy paper and plaster of Paris is also capable of being broken without too heavy a blow being necessary and when broken can be crumbled up by hand manipulation and the resulting crumbled particle form of the disintegrated shredded paper and plaster of Paris is of such size that it can be discharged through the small opening.

I claim:
1. A destructible form comprising a relatively thick layer of shredded balsa wood and a plaster binding composition, and a relatively thin coating thereover of gypsum and dextrine.

2. A destructible form comprising a relatively thick layer of shredded balsa wood and gypsum and a relatively thin coating thereover of gypsum and dextrine.

3. A destructible form comprising a relatively thick layer of shredded balsa wood and gypsum and a relatively thin coating thereover of gypsum and dextrine, said layers being capable of being crumbled down by manipulation to particle size so that such particles can be discharged through a small opening.

4. A destructible form comprising a relatively thick layer of shredded balsa wood and gypsum and a relatively thin coating thereover of gypsum and dextrine, and at least one vent hole formed in situ in said mold form.

5. A destructible form comprising a relatively thick layer of shredded wood and gypsum and a relatively thin coating thereover of gypsum and dextrine.

6. A destructible form comprising a relatively thick layer of shredded wood and gypsum and a relatively thin coating thereover of gypsum and dextrine, said layers being capable of being crumbled down by manipulation to particle size so that such particles can be discharged through a small opening.

7. A destructible form comprising a relatively thick layer of shredded wood and gypsum and a relatively thin coating thereover of gypsum and dextrine, and at least one vent hole formed in situ in said form.

ARTHUR BASESCU.

REFERENCES CITED

The following references are of record in the file of this patent:

UNITED STATES PATENTS

| Number | Name | Date |
|---|---|---|
| 313,501 | Kerner | Jan. 10, 1885 |
| 1,152,964 | Nielsen | Sept. 7, 1915 |
| 1,241,068 | Wexler | Sept. 25, 1917 |
| 1,256,621 | Weissmann | Feb. 19, 1918 |
| 1,301,893 | Armstrong | Apr. 29, 1919 |
| 1,585,743 | Venzie | May 25, 1926 |
| 2,189,154 | Stewart | Feb. 6, 1940 |
| 2,348,935 | Smith et al. | May 16, 1944 |
| 2,360,899 | Scharenberg | Oct. 24, 1944 |
| 2,364,710 | Greneker | Dec. 12, 1944 |
| 2,397,121 | Brennan | Mar. 26, 1946 |